(12) United States Patent
Takeuchi

(10) Patent No.: US 6,330,522 B1
(45) Date of Patent: Dec. 11, 2001

(54) ROTATIONAL ANGLE DETECTOR AND METHOD

(75) Inventor: Shuichi Takeuchi, Aichi (JP)

(73) Assignee: Kabushiki Kaisha Tokai Rika Denki Seisakusho (JP)

(*) Notice: Subject to any disclaimer, the term of this patent is extended or adjusted under 35 U.S.C. 154(b) by 0 days.

(21) Appl. No.: 09/397,177

(22) Filed: Sep. 16, 1999

(30) Foreign Application Priority Data

Sep. 17, 1998 (JP) .................................................. 10-262853

(51) Int. Cl.[7] ........................................................ G01D 5/34
(52) U.S. Cl. ........................ 702/151; 701/41; 250/231.16; 180/400; 341/3
(58) Field of Search ................................ 702/151; 701/41; 250/231.13, 231.16, 231.18; 341/11, 13, 2, 3, 6, 9; 180/400, 422, 429

(56) References Cited

U.S. PATENT DOCUMENTS

| | | | |
|---|---|---|---|
| 4,996,657 | * 2/1991 | Shiraishi et al. | 702/151 |
| 5,065,324 | * 11/1991 | Oshita et al. | 701/41 |
| 5,073,710 | * 12/1991 | Takagi et al. | 250/231.16 |
| 5,243,188 | * 9/1993 | Hattori et al. | 701/41 |
| 5,283,740 | * 2/1994 | Sato et al. | 701/43 |
| 5,787,375 | * 7/1998 | Madau et al. | 701/41 |

\* cited by examiner

Primary Examiner—Marc S. Hoff
Assistant Examiner—Hien Vo
(74) Attorney, Agent, or Firm—Akerman Senterfitt

(57) ABSTRACT

A rotor is fixed to a steering shaft to rotate with the steering shaft, and outer and inner slits are formed along different circles on the rotor. Outer and inner sensors, which detect the presence or absence of the slits, generate reflective codes and are located next to the rotor. Stored pattern data that matches the reflective code is used to determine the rotational angle. Alternatively, if the pattern data does not match the reflective codes, the rotational angle of the steering shaft is computed on the basis of the reflective codes.

12 Claims, 5 Drawing Sheets

Fig.6

| No. | rotational angle data | pattern data of outer reflective code 35 | | | | | | | pattern data of inner reflective code 36 | | | | |
|---|---|---|---|---|---|---|---|---|---|---|---|---|---|
| 0 | 0.00 | 0 | 1 | 0 | 0 | 0 | 0 | 0 | 0 | 0 | 1 | 1 | 1 |
| 1 | 0.86 | 0 | 1 | 0 | 1 | 0 | 0 | 0 | 0 | 0 | 0 | 1 | 1 |
| 2 | 1.71 | 0 | 1 | 1 | 1 | 0 | 0 | 0 | 0 | 0 | 0 | 0 | 1 |
| 3 | 2.57 | 0 | 1 | 1 | 1 | 0 | 1 | 0 | 0 | 1 | 0 | 0 | 1 |
| 4 | 3.43 | 0 | 0 | 1 | 1 | 0 | 1 | 0 | 0 | 1 | 1 | 0 | 1 |
| 5 | 4.29 | 0 | 0 | 1 | 1 | 1 | 1 | 0 | 0 | 1 | 1 | 1 | 1 |
| 6 | 5.14 | 1 | 0 | 1 | 1 | 1 | 1 | 0 | 0 | 1 | 1 | 1 | 0 |
| 7 | 6.00 | 1 | 0 | 1 | 1 | 1 | 1 | 1 | 0 | 0 | 1 | 1 | 0 |
| 8 | 6.86 | 1 | 0 | 0 | 1 | 1 | 1 | 1 | 0 | 0 | 0 | 1 | 0 |
| 9 | 7.71 | 1 | 0 | 0 | 1 | 1 | 0 | 1 | 1 | 0 | 0 | 1 | 0 |
| 10 | 8.57 | 1 | 0 | 0 | 1 | 0 | 0 | 1 | 1 | 1 | 0 | 1 | 0 |
| 11 | 9.43 | 1 | 0 | 0 | 0 | 0 | 0 | 1 | 1 | 1 | 1 | 1 | 0 |
| 12 | 10.29 | 1 | 0 | 0 | 0 | 0 | 0 | 0 | 1 | 1 | 1 | 0 | 0 |
| 13 | 11.14 | 1 | 0 | 1 | 0 | 0 | 0 | 0 | 0 | 1 | 1 | 0 | 0 |
| 14 | 12.00 | 1 | 1 | 1 | 0 | 0 | 0 | 0 | 0 | 0 | 1 | 0 | 0 |
| 15 | 12.86 | 1 | 1 | 1 | 0 | 1 | 0 | 0 | 0 | 0 | 1 | 0 | 1 |
| 16 | 13.71 | 0 | 1 | 1 | 0 | 1 | 0 | 0 | 1 | 0 | 1 | 0 | 1 |
| 17 | 14.57 | 0 | 1 | 1 | 1 | 1 | 0 | 0 | 1 | 1 | 1 | 0 | 1 |
| 18 | 15.43 | 0 | 1 | 1 | 1 | 1 | 0 | 1 | 1 | 1 | 0 | 0 | 1 |
| 19 | 16.29 | 0 | 1 | 1 | 1 | 1 | 1 | 1 | 1 | 1 | 0 | 0 | 0 |
| 20 | 17.14 | 0 | 0 | 1 | 1 | 1 | 1 | 1 | 0 | 1 | 0 | 0 | 0 |
| 21 | 18.00 | 0 | 0 | 1 | 1 | 0 | 1 | 1 | 0 | 1 | 0 | 1 | 0 |
| 22 | 18.86 | 0 | 0 | 1 | 0 | 0 | 1 | 1 | 0 | 1 | 0 | 1 | 1 |
| 23 | 19.71 | 0 | 0 | 0 | 0 | 0 | 1 | 1 | 1 | 1 | 0 | 1 | 1 |
| 24 | 20.57 | 0 | 0 | 0 | 0 | 0 | 0 | 1 | 1 | 0 | 0 | 1 | 1 |
| 25 | 21.43 | 0 | 1 | 0 | 0 | 0 | 0 | 1 | 1 | 0 | 0 | 0 | 1 |
| 26 | 22.29 | 1 | 1 | 0 | 0 | 0 | 0 | 1 | 1 | 0 | 0 | 0 | 0 |
| 27 | 23.14 | 1 | 1 | 0 | 1 | 0 | 0 | 1 | 1 | 0 | 1 | 0 | 0 |
| 28 | 24.00 | 1 | 1 | 0 | 1 | 0 | 0 | 0 | 1 | 0 | 1 | 1 | 0 |
| 29 | 24.86 | 1 | 1 | 1 | 1 | 0 | 0 | 0 | 1 | 0 | 1 | 1 | 1 |
| ⋮ | ⋮ | | | | ⋮ | | | | | | | | |
| 47 | 40.29 | 0 | 0 | 0 | 1 | 1 | 0 | 0 | | | | | |
| 48 | 41.14 | 0 | 0 | 0 | 0 | 1 | 0 | 0 | | | | | |
| 49 | 42.00 | 0 | 0 | 0 | 0 | 1 | 0 | 1 | | | | | |
| 50 | 42.86 | 0 | 0 | 0 | 0 | 1 | 1 | 1 | | | | | |
| 51 | 43.71 | 0 | 1 | 0 | 0 | 1 | 1 | 1 | | | | | |
| ⋮ | ⋮ | | | | ⋮ | | | | | | | | |
| 80 | 68.57 | 1 | 1 | 0 | 0 | 1 | 1 | 1 | | | | | |
| 81 | 69.43 | 1 | 1 | 0 | 0 | 1 | 1 | 0 | | | | | |
| 82 | 70.29 | 1 | 1 | 0 | 0 | 1 | 0 | 0 | | | | | |
| 83 | 71.14 | 1 | 1 | 0 | 0 | 0 | 0 | 0 | | | | | |

outer
reflective code
0000001
(20.57+72.00i)

tentative
reflective code
$\underline{1}$000001 → 9.43°+72.00°i
0$\underline{1}$00001 → 21.43°+72.00°i
00$\underline{1}$0001 → no value
000$\underline{1}$001 → no value
0000$\underline{1}$01 → 42.00°+72.00°i
00000$\underline{1}$1 → 19.71°+72.00°i
000000$\underline{0}$ → no value
(i=0, 1, 2, 3, 4)

Fig.7(b)

inner
reflective code
00111
(0.00+25.714j)

tentative
reflective code
$\underline{1}$0111 → 24.86°+25.714°j
0$\underline{1}$111 → 4.29°+25.714°j
00$\underline{0}$11 → 0.86°+25.714°j
00$\overline{1}$01 → 12.86°+25.714°j
0011$\underline{0}$ → 6.00°+25.714°j
(j=0, 1···13)

Fig. 8(a)

outer
reflective code
0000001
(20.57+72.00i)

tentative
reflective code
$\underline{1}$000001 → 9.43°+72.00°i
0$\underline{1}$00001 → 21.43°+72.00°i
00$\underline{1}$0001 → no value
000$\underline{1}$001 → no value
0000$\underline{1}$01 → 42.00°+72.00°i
00000$\underline{1}$1 → 19.71°+72.00°i
000000$\underline{0}$ → no value
(i=0, 1, 2, 3, 4)

Fig. 8(b)

inner
reflective code
10111
(24.86+25.714j)

tentative
reflective code
0$\underline{0}$111 → 0.00°+25.714°j
$\underline{1}$1111 → no value
10$\underline{0}$11 → 20.57°+25.714°j
101$\underline{0}$1 → 13.71°+25.714°j
1011$\underline{0}$ → 24.00°+25.714°j
(j=0, 1···13)

ROTATIONAL ANGLE DETECTOR AND METHOD

BACKGROUND OF THE INVENTION

The present invention relates to a detector and a method for detecting the rotational speed of a rotative member. More particularly, the present invention pertains to a detector and method for detecting a rotational angle of a vehicle steering shaft.

A typical rotational angle detector includes a rotor attached to a steering shaft. Slits are formed along a single circumference on the rotor. Luminous elements are arranged at one side of the rotor. Photodetectors, each of which corresponds to one of the luminous elements, are arranged at the opposite side of the rotor. When receiving light from the corresponding luminous element, each photodetector outputs a signal of H level. When light from the luminous element does not reach the photodetector, the photodetector outputs a signal of L level. A combination of signals of H level and signals of L level from the photodetectors represents a single reflective code.

The rotational angle detector has a memory. The memory previously stores data representing the relationship between reflective codes and rotational angles of the rotor. When a reflective code is generated based on signals from the luminous elements and the photodetectors, a pattern of reflective code that corresponds to the generated reflective code is retrieved from the memory. The rotational angle of the steering wheel is obtained based on the retrieved pattern data, which corresponds to the generated reflective code.

However, the above described rotational angle detector stores pattern data that correspond to all the reflective codes, which requires an increased memory capacity. Therefore, the manufacturing of the detector is costly.

SUMMARY OF THE INVENTION

Accordingly, it is an objective of the present invention to provide a rotational angle detector that reduces required memory capacity.

Other aspects and advantages of the present invention will become apparent from the following description, taken in conjunction with the accompany drawing, illustrating by way of example the principles of the invention.

BRIEF DESCRIPTION OF THE DRAWINGS

The features of the present invention that are believed to be a novel are set forth with particularity in the appended claims. The invention, together with objects and advantages thereof, may best be understood by reference to the following description of the presently preferred embodiments together with the accompanying drawings in which:

FIG. 6 is a chart showing a table storing reflective codes;

FIGS. 7(a) and 7(b) are charts used for calculating a rotational angle when a reflective code is not on the table of FIG. 6; and FIGS. 8(a) and 8(b) are charts used for calculating a rotational angle when a reflective code is not on the table of FIG. 6.

DETAILED DESCRIPTION OF THE PREFERRED EMBODIMENT

A rotational angle detector for a vehicle steering wheel according to one embodiment of the present invention will now be described.

Figure 1:
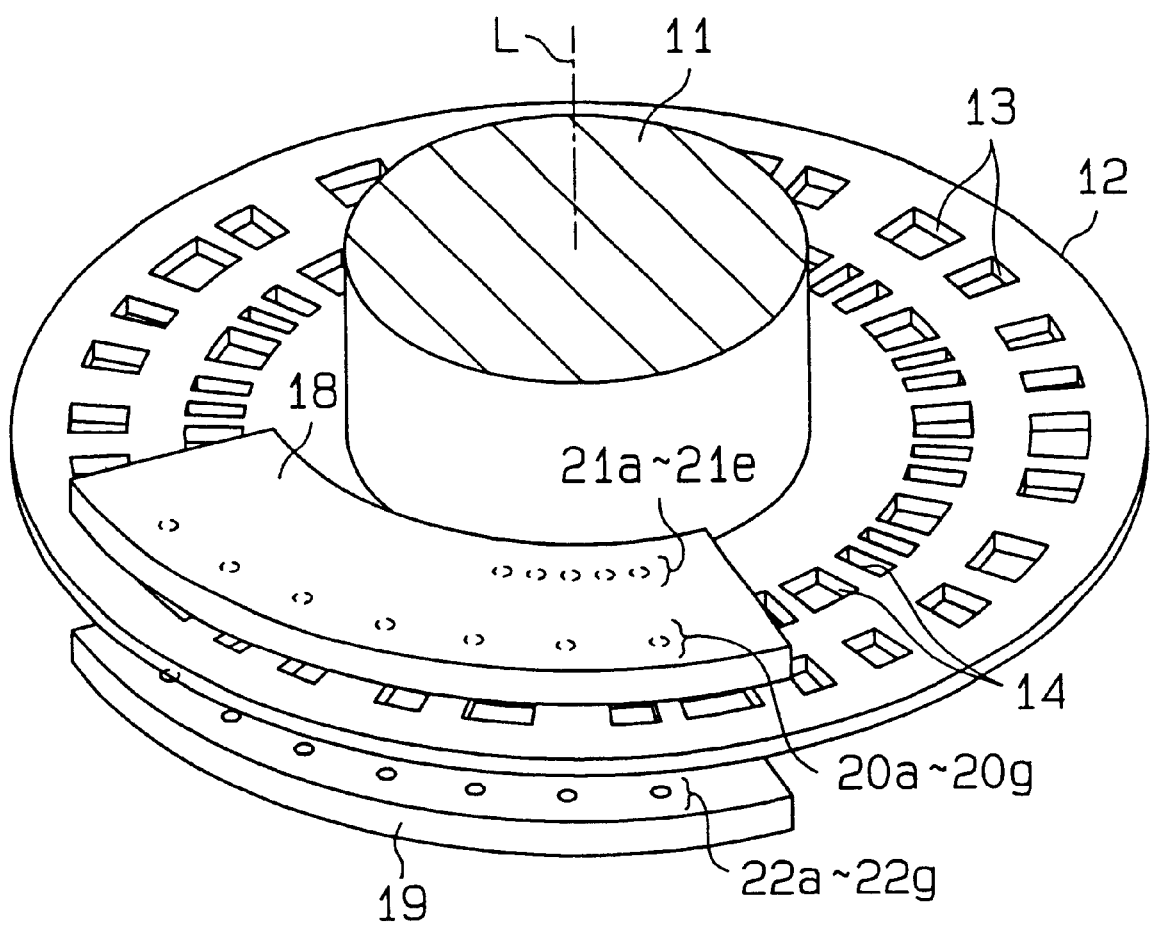
FIG. 1 is a perspective view illustrating a rotational angle detector.
Figure 2:
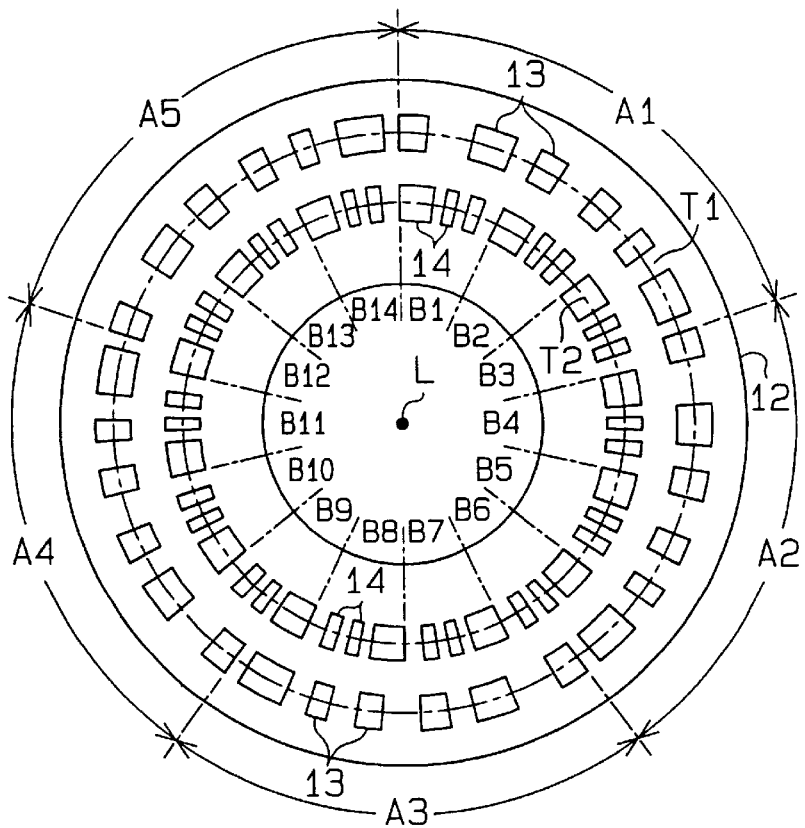
FIG. 2 is a plan view showing the rotor of FIG. 1.

As shown in FIGS. 1 and 2, a rotor 12 is fixed to a rotative member, which is a steering shaft 11 in this embodiment. The rotor 12 rotates integrally with the steering shaft 11 about an axis L of the steering shaft 11.

Outer slit regions A1 to A5 are defined along a circle having a radius R1 about the axis L. The circle having the radius R1 will hereafter be referred to a first track T1. The outer regions A1 to A5 are defined by evenly dividing the first track T1 by five. Each of the outer slit regions A1 to A5 therefore corresponds to a segment having an angle of 72°(360°/5). Each outer slit region A1 to A5 has six outer slits 13, which are formed along the first track T1. The pattern of sizes of the outer slits 13 and the spaces between adjacent slits 13 are the same for each of the outer slit regions A1 to A5.

Inner slit regions B1 to B14 are defined along a circle having a radius R2 (R2<R1) about the axis L. The circle of the radius R2 will hereafter be referred to a second track T2. The inner slit regions B1 to B14 are defined by evenly dividing the second track T2 by fourteen. Each of the inner slit regions B1 to B14 therefore corresponds to a segment having an angle of 25.714°(360°/14). Each inner slit region B1 to B14 has three inner slits 14, which are formed along the second track T2. The pattern of sizes of the inner slits 14 and the spaces between adjacent slits 14 are the same for each of the inner slit regions B1 to B14.

Figure 3:
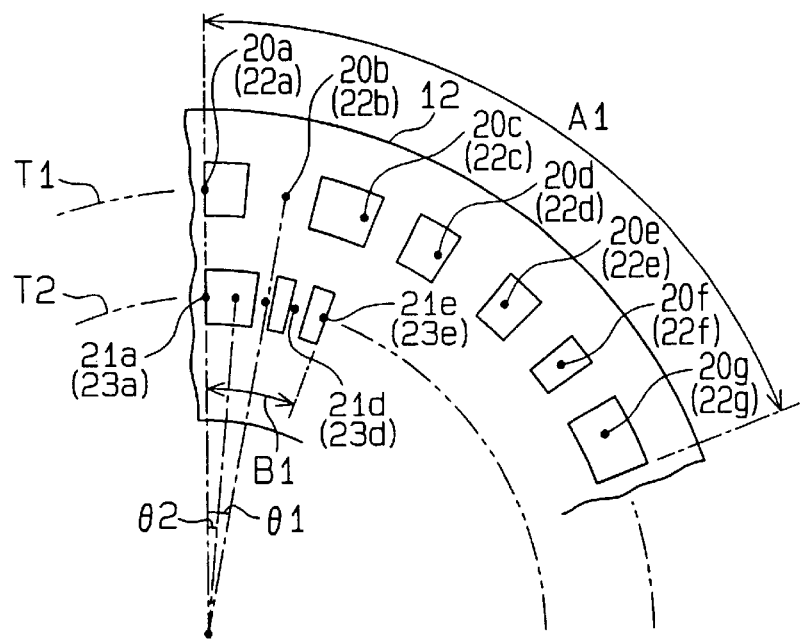
FIG. 3 is an enlarged plan view showing the rotor of FIG. 2.

As shown in FIGS. 1 to 3, a light emitter 18 and a light receiver 19 are arranged to face each other with the rotor 12 in between. The light emitter 18 includes first to seventh outer luminous elements 20a to 20g and first to fifth inner luminous elements 21a to 21e. The luminous elements 20a to 20g and 21a to 21e each include a light emitting diode. The light receiver 19 includes first to seventh outer photodetectors 22a to 22g and first to fifth inner photodetectors 23a to 23e. The photodetectors 22a to 22g and 23a to 23e each include a photodiode.

Each outer luminous element 20a to 20g faces a corresponding one of the outer photodetectors 20a to 20g. Also, each inner luminous element 21a to 21e faces a corresponding one of the inner photodetectors 23a to 23e. The outer and inner luminous elements 20a to 20g and 21a to 21e and the outer and inner photodetectors 22a to 22g and 23a to 23e are arranged on a limited arcuate region of the rotor 12.

The outer luminous elements 20a to 20g and the outer photodetectors 22a to 22g form an outer sensor. The inner luminous elements 21a to 21e and the inner photodetectors 23a to 23e form an inner sensor.

The outer luminous elements 20a to 20g and the outer photodetectors 22a to 22g are located along the first track T1 and are spaced apart by equal angular intervals. That is, as shown in FIG. 3, the outer luminous elements 20a to 20g and the outer photodetectors 22a to 22g are spaced apart by approximately 10.29°(the angle θ1 of FIG. 3). The angle θ1 is obtained by dividing 72°, which is the angular range of each outer region A1 to A5, by seven (72°/7).

The inner luminous elements 21a to 21e and the inner photodetectors 23a to 23e are located along the second track T2 and are spaced apart by equal angular intervals. That is, as shown in FIG. 3, the inner luminous elements 21a to 21e and the inner photodetectors 23a to 23e are spaced apart by 5.14° (the angle θ2 of FIG. 3). The angle of θ2 is obtained by dividing 25.714°, which is the angular range of each inner region B1 to B14, by five (25.714°/5). The angular interval (5.14°) between each pair of the inner photodetectors 23a to 23e is half of the angular interval (10.29°) between each pair of the outer photodetectors 22a to 22g.

Figure 4:
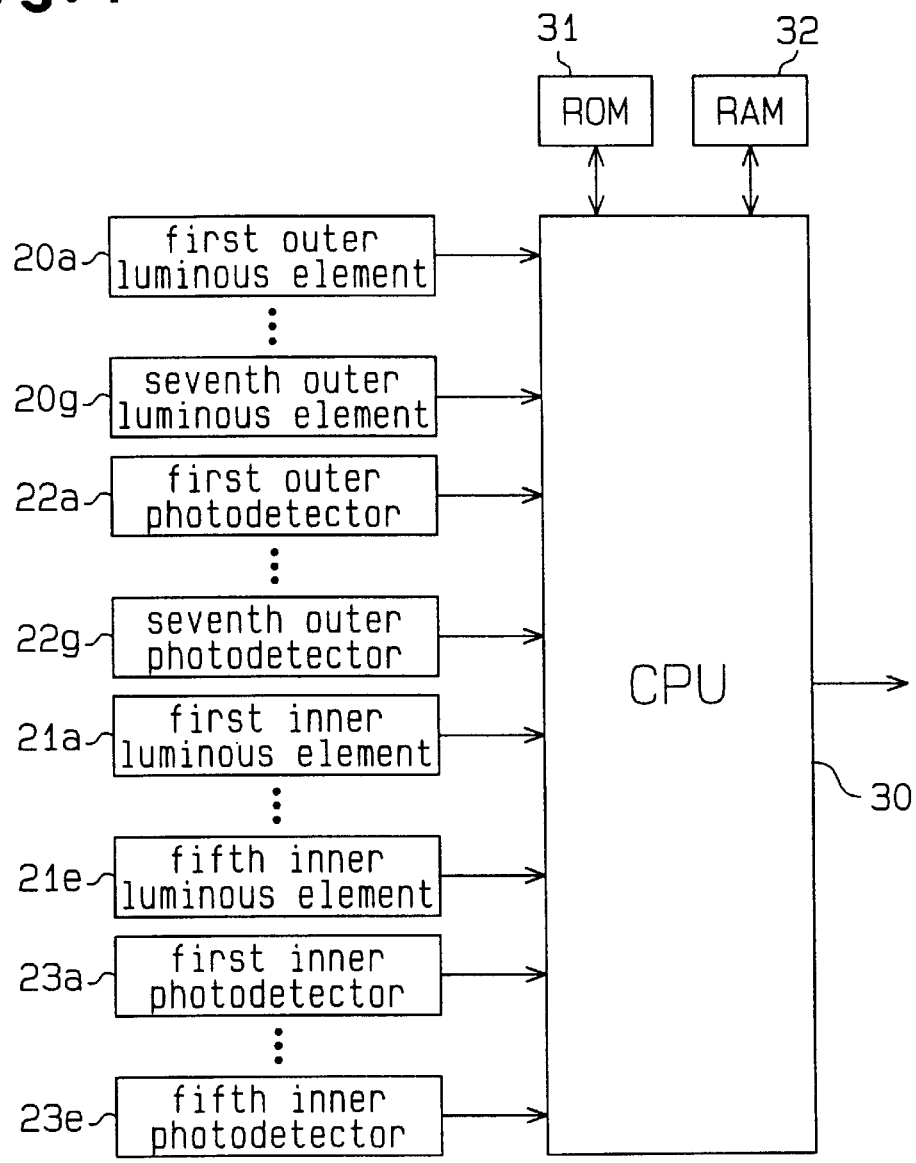
FIG. 4 is a schematic circuit diagram of the detector of FIG. 1.

The circuit construction of the rotational angle detector will now be described. As shown in FIG. 4, a central processing unit (CPU) 30 controls devices in the detector. A read only memory (ROM) 31 stores various control programs. A random access memory (RAM) 32 temporarily stores data obtained through performing the control programs. The CPU 30 serves as judging means, selecting means and computing means. The ROM 31 serves as memory.

The first to seventh outer luminous elements 20a to 20g, the first to fifth inner luminous elements 21a to 21e, the first to seventh outer photodetectors 22a to 22g and first to fifth inner photodetectors 23a to 23e are connected to the CPU 30.

Figure 5:
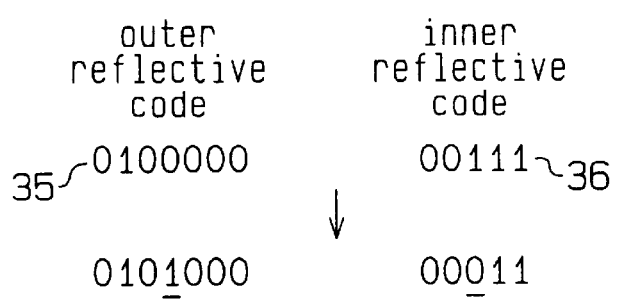
FIG. 5 is a chart showing reflective codes.

When each outer photodetector 22a to 22g receives light from the corresponding outer luminous element 20a to 20g through the outer slits 13 of the rotor 12, the photodetector 22a to 22b sends a signal of H level to the CPU 30. When light from each outer luminous element 20a to 20g is blocked and the corresponding outer photodetector 22a to 22g does not receive the light, the photodetector 20a to 22g sends a signal of L level to the CPU 30. The CPU 30 obtains a seven-bit reflective code (see FIG. 5) in accordance with the combination of H level signals and L level signals from the outer photodetectors 22a to 22g. H level is represented by one, and L level is represented by zero. Reflective code is a modified binary code in which sequential numbers are represented by expressions that differ only in one bit. In the example of FIG. 5, in an outer reflective code 35, the fourth digit from the right is changed from zero to one, or from L level to H level.

When each inner photodetector 23a to 23e receives light from the corresponding inner luminous element 21a to 21e through the inner slits 14 of the rotor 12, the photodetector 23a to 23e sends a signal having an H level to the CPU 30. When light from each inner luminous element 21a to 21e is blocked and the corresponding inner photodetector 23a to 23e does not receive the light, the photodetector 23a to 23e sends a signal of L level to the CPU 30. The CPU 30 obtains a five-bit reflective code (see FIG. 5) in accordance with the combination of H level signals and L level signals from the inner photodetectors 23a to 23e. In the example of FIG. 5, the third digit from the right of an inner reflective code 36 is changed from H level to L level.

The seven-bit outer reflective code 35 and the five-bit inner reflective code 36 form a twelve-bit reflective code, or combined code. As described above, when the twelve-bit reflective code changes to a subsequent code, one bit, or digit, of each of the outer reflective code 35 and the inner reflective code 36 is changed. Therefore, as shown in FIG. 5, the second, subsequent twelve-bit reflective code differs by two bits.

The ROM 31 stores a table 37 shown in FIG. 6. The table 37 defines the relationship between the outer and inner reflective codes 35, 36 and the rotational angle of the steering shaft 11. The table 37 includes eighty-four outer reflective codes 35. The eighty-four outer reflective codes 35 correspond to eighty-four angular subdivisions of a given outer slit region A1 to A5. The table 37 also includes thirty inner reflective codes 36. The thirty inner Areflective codes 36 correspond to thirty subdivisions of a given inner slit region B1 to B14.

For example, in the eleventh row (combined code No. 10) in the table 37, the outer reflective code is 1001001 and the inner reflective code is 11010. In this state, the rotational angle data is 8.57°. The rotational angle data has increments of 0.86°. That is, the resolution of the rotational angle detector is 0.86°.

The operation of the rotational angle detector will now be described. The CPU 30 performs the following operation based on control programs stored in the ROM 31.

First, a case where a twelve-bit reflective code from the light receiver 19 is in the table 37 will be described.

When the ignition switch is turned on, power is supplied to the rotational angle detector. Then, the luminous elements 20a to 20g and 21a to 21e emit light toward the photodetectors 22a to 22g and 23a to 23e. Accordingly, the photodetectors 22a to 22g and 23a to 23e output H level signals and L level signals. The combination of the signals defines the outer and inner reflective codes 35, 36. The CPU 30 judges whether the resulting reflective codes are in the table 37.

For example, if the outer reflective code 35 is 1001001 and the inner reflective code 36 is 11010, the twelve-bit reflective code is 100100111010, which is represented by the eleventh row (code No. 10) of the table 36. Combination code No. 10 corresponds to an 8.57° angle of the steering wheel.

A case where a twelve-bit reflective code from the light receiver 19 is not in the table 37 will now be described.

If the outer reflective code 35 is 0000001 and the inner reflective code 36 is 00111, the twelve-bit reflective code 000000100111 does not match any of the combined codes in the table 37. In this case, the rotational angle of the steering shaft 11 is separately computed based on the outer reflective code 35 and the inner reflective code 36.

That is, the outer reflective code 35, which is 0000001, corresponds to the twenty-fifth row (code No. 24) of FIG. 24, which is 20.57°. Since the sizes and arrangement of the outer slits 13 are common to all the outer slit regions A1 to A5, the outer reflective code 35 corresponds to a certain position in one of the outer regions A1 to A5. Therefore, as shown in FIG. 7(a), the rotational angle computed based on the outer reflective code 35 is expressed by a formula 20.57°+72.00°i, where i is one of the values 0, 1, 2, 3 and 4.

As shown in FIGS. 7(a) and 7(b), the program is performed assuming that a one-bit reading error might occur in the outer reflective code 35 and the inner reflective code 36. This is because the detecting accuracy of the outer photodetectors 22a to 22g and the inner photodetector 23a to 23e can cause errors. Therefore, when the outer reflective code 35 has a value 0000001, the CPU 30 prepares the following tentative reflective codes, which correspond to expected errors. With the value 0000001, the tentative codes of the outer reflective code 35 are 1000001, 01000001, 0100001, 0001001, 0000101, 0000011 and 0000000.

The CPU 30 selects pattern data, or codes, corresponding to the tentative reflective codes from the table 37. In the case of FIG. 7(a), the CPU 30 selects code No. 11 (1000001), code No. 25 (0100001), code No. 49 (0000101) and code No. 23 (0000011). The rotational angle that corresponds to the tentative reflective code of 1000001 is 9.43°+72.00°i. The rotational angle that corresponds to the tentative reflective code of 0100001 is 21.43°+72.00°i. The rotational angle that corresponds to the tentative reflective code of 0000101 is 42.00°+72.00°i. The rotational angle that corresponds to the tentative reflective code of 0000011 is 19.71°+72.00°i.

On the other hand, the rotational angle data corresponding to the inner reflective code 36 having a value "00111" is 0.00° as shown by code No. 0 of FIG. 6. Since the sizes and arrangement of the inner slits 14 are common to all the inner slit regions B1 to B14, the inner reflective code 36 corresponds to a certain position in one of the inner regions B1 to B14. Therefore, as shown in FIG. 7(*b*), a rotational angle computed based on the inner reflective code 36 is expressed by a formula 0.00°+25.714°j, wherein j is one of the values 0, 1, 2, 3, 4, 5, 6, 7, 8, 9, 10, 11, 12 and 13.

As shown in FIG. 7(*b*), the program is performed assuming that a one-bit reading error might occur in the inner reflective code 36. Therefore when the inner reflective code 36 has a value 00111, the CPU 30 prepares the following tentative reflective codes, which correspond to expected errors. With the value 00111, the tentative codes of the inner reflective code 36 are 10111, 01111, 00011, 00101 and 00110.

The CPU 30 selects codes corresponding to the tentative reflective codes from the table 37. In the case of FIG. 7(*b*), the CPU 30 selects code No. 29 (10111), No. 5 (01111), No. 1 (00011), No. 15 (000101) and No. 7 (00110). A rotational angle that corresponds to the tentative reflective code of 10111 is 24.85°+25.714°j. A rotational angle that corresponds to the tentative reflective code of 01111 is 4.29°+25.714°j. A rotational angle that corresponds to the tentative reflective code of 00011 is 0.86°+25.714°j. A rotational angle that corresponds to the tentative reflective code of 00101 is 12.86°+25.714°j. A rotational angle that corresponds to the tentative reflective code of 00110 is 6.00°+25.714°j.

The resolution of the rotational angle detector is 0.86°. Thus, as shown in FIG. 7(*a*), the angles 19.71°+72.00°i, 20.57°+72.00°i and 21.43°+72.00°i are consecutive angles. Among these angles, the angle 20.57°+72.00°i is the middle.

As shown in FIG. 7(*b*), the angles 0.00°+25.714°j, 0.86°+25.714°j and 24.86°+25.714°j are consecutive angles. Among these angles, the angle 0.00°+25.714°j is the middle.

Judging from the characteristics of reflective codes, the middle values (20.57°+72.00°i and 0.00°+25.714°j) represent the rotational angle of the steering shaft 11. That is, the rotational angle of the steering shaft 11 is 20.57°+72.00°i according to outer reflective code 35 and is 0.00°+25.714°j according to the inner reflective code 36. Then, the angle value 20.57°+72.00°i is calculated with i replaced with 0, 1, 2, 3 and 4. Also, the value 0.00°+25.714°j is calculated with j replaced with 0, 1, 2, 3, 4, 5, 6, 7, 8, 9, 10, 11, 12 and 13. As a result, when i is replaced with 4 and j is replaced with 12, the values 20.57°+72.00°i and the value 0.00°+25.714°j are both 308.57°, or equal to each other. In this manner, when the outer reflective code 35 is 0000001 and the inner reflective code 00111, the combination of which is not on the table 37, the CPU 30 determines that the rotational angle of the drive shaft 11 is 308.57°.

Next, a case where the combination of the reflective codes 35, 36 is not on the table 37 and the rotational angle of the steering shaft 11 is below the resolution will be described.

For example, if the outer reflective code 35 is 0000001 and the inner reflective code 36 is 10111, the combined twelve-bit reflective code is 000000110111. The CPU 30 judges that the value 000000110111 is not in the table 37. The CPU 40 therefore computes the rotational angle of the steering shaft 11 based separately on the outer reflective code 35 and the inner reflective code 36.

FIG. 8(*a*) shows a case in which the rotational angle of the drive shaft 11 is such that the outer reflective code 35 from the light receiver 19 is 0000001. This is the same as the case of FIG. 7(*a*). Therefore, the rotational angle of the outer reflective code 35 is computed as 20.57°+72.00°i.

On the other hand, the rotational angle data according to the inner reflective code 36 of 10111 is 24.86° as shown by code No. 29 of FIG. 6. Therefore, as shown in FIG. 8(*b*), the rotational angle of the steering shaft 11 computed based on the inner reflective code 36 has a value 24.86°+25.714°j, in which j is one of the values 0 to 13.

Also, as shown in FIG. 8(*b*), assuming that the inner reflective code 36 might have a one-bit reading error, the attentive inner reflective codes 36 having values 00111, 11111, 10011, 10101 and 10110 are prepared.

Then, the CPU 30 selects values that are in the table 37 among the expected inner reflective codes. In the case of FIG. 8(*b*), code No. 0 (00111), code No. 24 (10011), code No. 16 (10101) and code No. 28 (10110) are selected. When the inner reflective code is 00111, the rotational angle is 0.00°+25.714°j. When the inner reflective code is 10011, the rotational angle is 20.57°+25.714°j. When the inner reflective code is 10101, the rotational angle is 13.71°+25.714°j. When the inner reflective code is 10110, the rotational angle is 24.00°+25.714°j.

The resolution of the rotational angle detector is 0.86°. Thus, as shown in FIG. 8(*b*), the angles 24.00°+25.714°j, 24.86°+25.714°j and 0.00°+25.714°j are consecutive angles. Among these angles, the angle of 24.86°+25.714°i is the middle value. As described above, the middle value represents the actual rotational angle of the steering wheel 11. Thus, the rotational angle of the steering shaft 11 computed based on the inner reflective code 36 is expressed by a value 24.86°+25.714°j.

Next, the value 24.86°+25.714°j is computed by replacing j with 0 to 13. Accordingly, tentative rotational angles of the steering shaft 11 are obtained. The tentative angles are 24.86°, 76.29°, 102.00°, 127.71°, 153.43°, 179.14°, 204.86°, 230.57°, 256.29°, 282.00°, 307.71°, 333.43° and 359.14°.

The rotational angle of the steering shaft 11 computed based on the outer reflective code 35 is 20.570+72.00°i. The symbol i is replaced with 0 to 4. Accordingly, tentative steering shaft angles are 20.57°, 92.57°, 236.57° and 308.57°.

Thus, the angle computed based on the inner reflective code 36 and the angle computed based on the outer reflective code 35 do not match. In this case, the CPU 30 judges that there is a difference of 0.86° between the angle based on the outer reflective code 35 and the angle based on the inner reflective code 36. Therefore, the rotational angle computed based on the inner reflective code 36 is 307.71° and the rotational angle computed based on the outer reflective code 35 is 308.57°. That is, the actual rotational angle of the steering shaft 11 is between 307.71° and 308.57°.

If the rotational angle of the steering shaft 11 cannot be computed by the above process, the CPU 30 judges that the outer and inner reflective codes 35, 36 have erroneous values. In this case, the rotational angle of the steering shaft 11 is not computed.

The illustrated embodiment has the following advantages.

(1) The ROM 31 stores the table 37, which includes the pattern data of the reflective codes 35, 36 and the corresponding rotational angle data. If a combined reflective code appears in the table 37, the CPU 30 judges that the rotational angle of the steering shaft 11 is represented by the pattern data. When a combined reflective code is not on the table 37, the CPU 30 computes the rotational angle of the steering shaft 11 based on the reflective codes 35, 36.

Although, the resolution of the detector is 0.86°, the ROM 31 does not have to store 420 (420=360°/0.86°) patterns of data, codes. That is, as for the outer reflective code 35, the ROM 31 stores eighty-four codes, which correspond eighty-four positions within a given outer slit region A1 to A5. As for the inner reflective code 36, the ROM 31 stores thirty patterns of data, or codes, which correspond to thirty positions within a given inner slit region B1 to B14. In other words, there is no need for the ROM 31 to store all the pattern data corresponding to all the regions A1 to A5 and B1 to B14, which minimizes the required memory capacity of the ROM 31.

(2) The rotational angle of the steering shaft 11, or rotative member, is separately computed based on the outer reflective code 35 and the inner reflective code 36. Even if the rotational angle computed based on the outer reflective code 35 does not match the rotational angle computed based on the inner reflective code 36, the actual angle of the steering shaft 11 is inferred within an error of 0.86°.

(3) It is assumed that the outer and inner reflective codes 35, 36 may have a one-bit reading error. The rotational angle of the steering shaft 11 is computed based on the tentative reflective codes. Therefore, the rotational angle of the steering shaft 11 is computed based on the wide variety of data, which improves the detection accuracy of the rotational angle.

(4) The outer luminous elements 20a to 20g, the inner luminous elements 21a to 21e, the outer photodetectors 22a to 22g and the inner photodetectors 23a to 23e are concentrated on a limited arcuate segment of the rotor 12, which adds to the flexibility of the design and facilitates changes of the specifications and design.

It should be apparent to those skilled in the art that the present invention may be embodied in many other specific forms without departing from the spirit or scope of the invention. Particularly, it should be understood that the invention may be embodied in the following forms.

In the illustrated embodiment, a single array of the inner slits 14 is formed radially inside the outer slits 13. However, the inner slits 14 may be formed on circles having different radiuses.

In the illustrated embodiment, the outer and inner luminous elements 20a to 20g and 21a to 21e and the outer and inner photodetectors 22a to 22g and 23a to 23e are located in a limited arcuate segment of the rotor 12. However, the luminous elements 20a to 20g and 21a to 21e and the photodetectors 22a to 22g and 23a to 23e may be evenly arranged along the entire circumference of the rotor 12.

The present invention is used to detect the rotational angle of the steering shaft 11 in the illustrated embodiment. However, the present invention may be embodied in other devices.

The ROM 31 does not have to store all the rotational angle data, which reduces the required memory capacity of the ROM 31. Also, the rotational angle of the steering shaft 11 is detected with an error within the resolution, which improves the detection accuracy of the rotational angle detector.

The present examples and embodiments are to be considered as illustrative and not restrictive, and the invention is not to be limited to the details given herein, but may be modified within the scope and equivalence of the appended claims.

What is claimed is:

1. A detector for detecting the rotational angle of a rotative member comprising:
    a rotor rotating together with the rotative member;
    outer and inner slits located along respective circles, which differ in radius, on the rotor, the center of the circles being the axis of the rotor;
    outer and inner sensors located in places corresponding to the outer and inner slits, respectively, wherein the outer and inner sensors detect the presence or absence of each of the slits and generate outer and inner reflective codes, respectively;
    a memory for memorizing patterns of data representing variations of reflective codes and corresponding rotational angle data;
    a judgment means for judging whether or not a detected reflective code matches a pattern of data in the memory;
    a selection means for selecting the rotational angle data corresponding to a pattern that is judged to match a detected reflective code by the judgment means; and
    a computing means for computing the rotational angle of the rotor on the basis of the reflective codes generated by the sensors if such reflective codes are not judged to match a pattern of data in the memory by the judgment means.

2. The detector according to claim 1, wherein the computing means computes rotational angles of the rotative member using the outer reflective codes obtained with the outer sensor and, separately, using the inner reflective codes obtained with the inner sensor.

3. The detector according to claim 1, wherein the computing means computes rotational angles of the rotative member with tentative reflective codes derived from the assumption that the reflective codes obtained with the sensors have a reading error of one bit.

4. The detector according to claim 1, wherein each of the outer and inner sensors comprises a luminous element and a photodetector.

5. The detector according to claim 1, wherein a plurality of outer slit regions and a plurality of inner slit regions are fixed on the rotor, wherein the sizes of corresponding slits in the outer regions are the same, and the sizes of corresponding slits in the inner regions are the same and wherein corresponding spaces between neighboring slits in each outer slit region are the same, and corresponding spaces between neighboring slits in each inner slit region are the same.

6. The detector according to claim 1, wherein the outer and inner sensors are each located in a certain segment of the circles.

7. A method for detecting the rotational angle of a rotative member comprising:
    irradiating light on outer and inner slits formed in a rotor that rotates together with the rotative member;
    detecting the presence or absence of each slit with outer and inner sensors;
    providing reflective codes on the basis of the detection;
    comparing the detected reflective codes with stored patterns of data; and
    selecting a rotational angle based on the data if the pattern data matches the reflective codes; and
    computing a rotational angle of the rotor on the basis of the reflective codes if the reflective codes do not match the pattern data.

8. The method according to claim 7, wherein the computing means computes rotational angles of the rotative member using the outer reflective codes obtained with the outer sensor and, separately, using the inner reflective codes obtained with the inner sensor.

9. The method according to claim 7, wherein the computing means computes rotational angles of the rotative member with tentative reflective codes derived from the assumption that the reflective codes obtained with the sensors have a reading error of one bit.

10. The method according to claim 7, wherein each of the outer and inner sensors comprises an luminous element and a photodetector.

11. The method according to claim 7, wherein a plurality of outer slit regions and a plurality of inner slit regions are fixed on the rotor, wherein the sizes of corresponding slits in the outer regions are the same, and the sizes of corresponding slits in the inner regions are the same and wherein corresponding spaces between neighboring slits in each outer slit region are the same, and corresponding spaces between neighboring slits in each inner slit region are the same.

12. The method according to claim 7, wherein the outer and inner sensors are each located in a certain segment of the circles.

* * * * *